Figure 1:
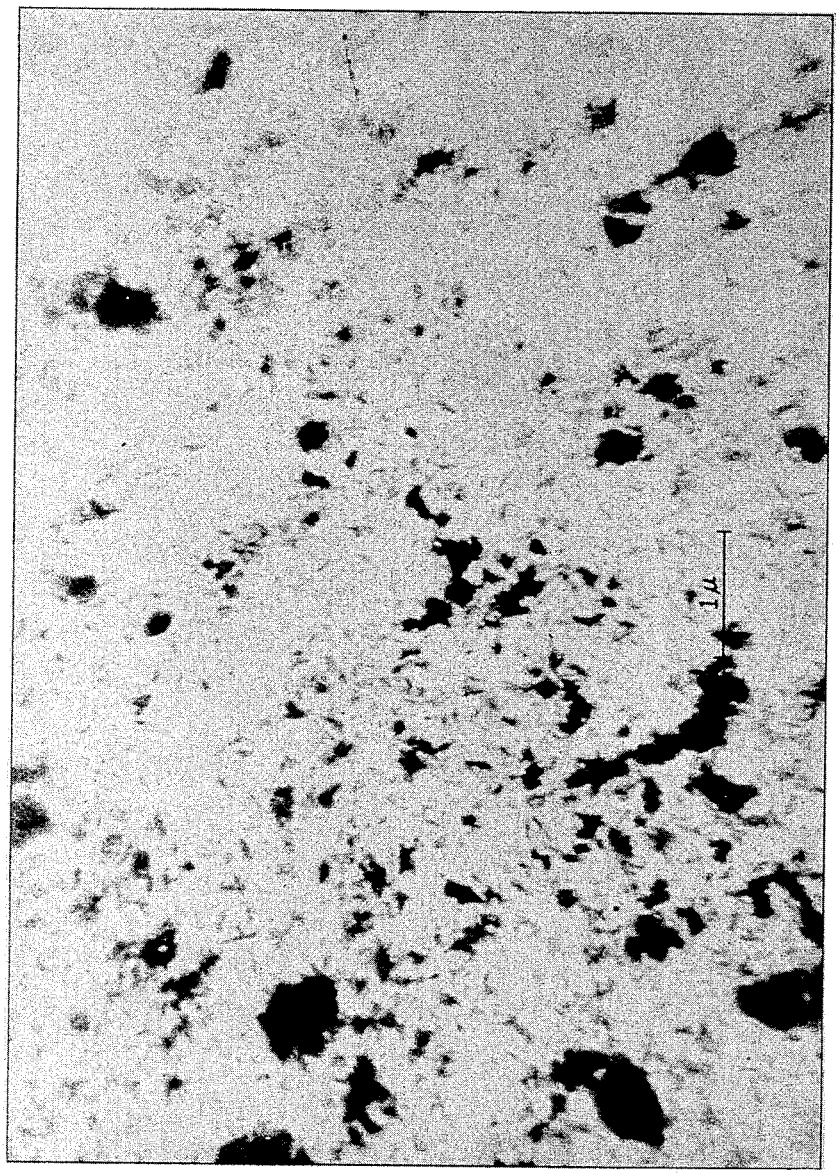

April 29, 1952  J. M. GRIM  2,594,913
SUSPENSION POLYMERIZATION EMPLOYING PHOSPHATES
OF SUBMICRONIC PARTICLE SIZE
Filed Nov. 18, 1947  7 Sheets-Sheet 1

INVENTOR.
JOHN M. GRIM.
BY Walter J. Monacelli
ATTORNEY.

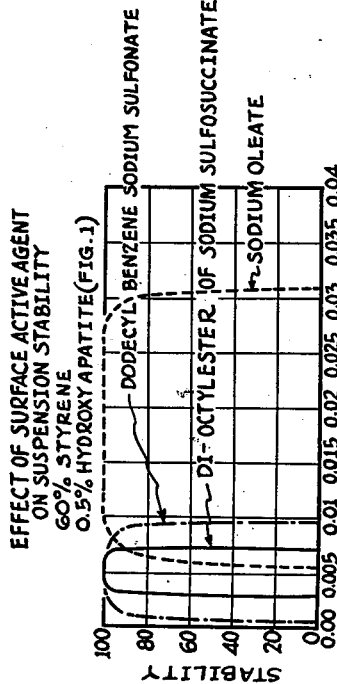
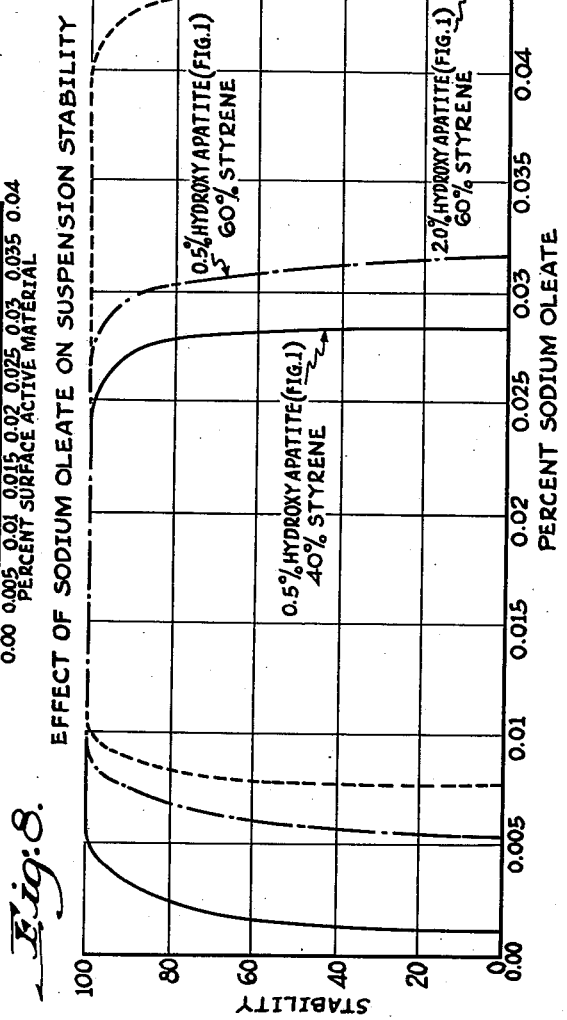

Patented Apr. 29, 1952

2,594,913

UNITED STATES PATENT OFFICE 2,594,913

SUSPENSION POLYMERIZATION EMPLOYING PHOSPHATES OF SUBMICRONIC PARTICLE SIZE

John Marshall Grim, Pittsburgh, Pa., assignor to Koppers Company, Inc., Pittsburgh, Pa., a corporation of Delaware Application November 18, 1947, Serial No. 786,655

13 Claims. (Cl. 260—93.5)

This invention relates to polymerization and is particularly directed to new and improved methods of producing bead-shaped polymeric materials.

Generally, bead-shaped polymeric materials, hereinafter referred to as "bead polymers," are formed in suspension polymerization, which is sometimes designated as pearl polymerization, bead polymerization or granular polymerization. In these processes, a polymerizable ethylenic monomer is dispersed or suspended in an immiscible liquid, such as water, in such a way that on completion of the process the polymer settles out as spherical particles or beads.

It is known that the formation of bead polymers of polymerizable ethylenic monomers may be accomplished with an aqueous suspension of the monomer in the presence of a dispersing agent which helps to keep the globules of monomer dispersed during the polymerization. Such difficultly soluble phosphates as the calcium, barium, and magnesium phosphates have been proposed as dispersing agents for this purpose because of their ability to function as suspension stabilizers or agglomeration inhibitors. Under very restrictive conditions or attendant disadvantages, as described hereinafter, these phosphate compounds tend to prevent or diminish the tendency of the globules of the dispersed polymerizing monomer or polymerization product to agglomerate or coalesce during the polymerization.

It is now known that these difficultly soluble phosphates are not completely satisfactory for this purpose, and generally the present practice of suspension polymerization with these dispersing agents is accompanied by a number of serious limitations. Firstly, an individual phosphate of this group may be unpredictable and erratic in its performance and efficiency in these polymerizations. In fact, the same chemical entity obtained from different manufacturers, and sometimes even from the same manufacturer, may be sharply contrasting in its utility for this purpose. It has been found by the present inventor that the difficulty in obtaining efficient operation of the difficultly soluble phosphates as dispersing agents is usually due to the predominance of relatively large particles in such phosphates.

Secondly, the productive capacity of suspension polymerization equipment is restricted to a relatively low output because of the low monomer/water ratio which is required in order to obtain bead polymers of desired properties for molding. In producing polymers of sufficient molecular weight to give the desired properties, it is necessary under present practice to use a low monomer/water ratio to prevent the dispersed globules from coalescing completely during the period required to obtain the desired polymerization.

On the other hand, and thirdly, if it is desired to increase the ouput of the given equipment by increasing the monomer/water ratio, it is found that the critical, sticky or gummy phase of the polymerization process, which is claimed to occur somewhere between 20 and 70% conversion of styrene to polymer, must be made relatively short in duration by the use of large amounts of catalyst. These large amounts of catalyst apparently speed the polymerization through the sticky phase before the globules have the opportunity to coalesce completely, but the resultant high polymerization rates produce polymers having molecular weights lower than desired in polymers to be used in the molding trade.

The general purpose and object of the present invention is to circumvent, simply and effectively, the above-described limitations of suspension polymerization processes employing difficultly soluble phosphates as dispersing agents, or suspension stabilizers, so that existing or contemplated installations can be optionally employed to produce, as required, either high or low outputs of bead polymers having either high or low molecular weights. Another object is to provide, for the stated purpose, suitable phosphates other than those mentioned above, as well as novel chemical and improved physical forms of the difficultly soluble phosphates. Still other objects are to provide polymerization suspensions which are substantially insensitive to irregularities in composition or in physical operating conditions, to provide improved control of bead size and provide processes in which reproducible results can be consistently obtained. The invention has for further objects such other improvements and such other operative advantages as may be found to result from the methods and apparatus hereinafter described or claimed.

In the accompanying drawings, Figures 1, 2, 3, 4, 5 and 6 are electron micrographs of phosphate particles of diverse sizes, and Figures 7 and 8 are graphs illustrating certain features of the invention as will be described.

The aforestated objects and others, which will become apparent from the description, are accomplished in the present invention by using a difficultly soluble phosphate containing at least three equivalents of metal for each phosphate group and having a particle size which is predominantly in the order of a submicron, and in some cases further modifying the effectiveness of the phosphate with an "extender." The "extenders" of this invention comprise anionic surface-active agents which aid the difficultly soluble phosphates in giving markedly more stable suspensions which are relatively insensitive to variations in the composition of the suspension, and to irregularities in physical operating conditions. It has also been found that certain difficultly soluble basic phosphates such as hydroxy apatites, are generally more effective than other difficultly soluble phosphates for stabilizing such suspensions.

As mentioned above and as illustrated by examples hereinafter, one obstacle in the way of obtaining desired results consistently with difficutly soluble phosphates of the prior art was found to be the relatively large size of the phosphate particles. This was indicated by studies of the particle size of certain difficultly soluble phosphates which were quite erratic and unpredictable in their behavior as dispersing agents for suspension polymerization. In investigating the effect of particle size, the particle sizes of some of these phosphates which operated erratically were reduced by milling or grinding to sizes predominantly in the order of a "sub-micron." As illustrated later, some of these phosphates which originally operated unsatisfactorily with large particle size were improved in efficiency upon reduction of the particle size.

The term "submicron" is used in the sense defined in Hackh's Chemical Dictionary, Third Edition, page 813, as meaning a particle between 0.2 and 0.005 micron in diameter. The terms "extender" is applied to the anionic surface-active agents, which act as an adjuvant in boosting or increasing the capacity or ability of the above-described phosphate dispersing agents to stabilize the suspensions described herein. These "extenders" give to the phosphate dispersing agents, which have a limited capacity or ability to stabilize dispersions, an additional capacity of an amount and type over and above that possible by the use of increased quantities of the phosphates. The results and efficiency of their operation are clearly illustrated in a number of the examples given later.

"Difficulty soluble" phosphates are those phosphates which are not classifiable as water-soluble phosphates. The term "difficultly soluble" includes in its scope the terms "insoluble," "very slightly soluble" and "slightly soluble" given in Hackh's Chemical Dictionary, Third Edition, page 787, and is intended to mean that more than 100 parts by weight of water are required to dissolve one part by weight of phosphate. In all cases in the practice of this invention, there should be enough phosphate present to have undissolved phosphate particles in the suspension system. The base or metal component of these phosphates may be any metal whose carbonate is also difficultly soluble in water. Thus, the metal may be calcium, barium, strontium, magnesium, aluminum, zinc, cadminum, iron and like metals, all of which give difficultly soluble phosphates.

Phosphates of the type and particle size described above as suitable for the practice of the invention may be prepared by precipitation methods. For example, methathetic or double decomposition reactions may be used to obtain precipitates of difficultly soluble phosphates, such as the reaction of ortho-phosphoric acid with an appropriate oxide or base, for example, with calcium oxide, or the reaction of a water-soluble salt of ortho-phosphoric acid with an appropriate salt or base, for example, trisodium phosphate with calcium chloride. Phosphates having the desired proportions of three or more equivalents of metal or base for each phosphate group may be obtained by the use of stoichiometric proportions in the double decomposition reactions or by hydrolysis of the secondary or tertiary phosphates. However, a strict adherence to stoichiometric proportions of three or more equivalents of base for each phosphate group is not always necessary. In some cases, satisfactory products have been obtained with as little as 2.5 equivalents of base for each phosphate group. In some cases, however, it is believed that the products are mixtures of compounds containing three or more equivalents of base with compounds containing less than three equivalents of base; and that the effective components of the mixtures are the phosphates containing three or more equivalents of base. This belief is supported by the fact that, in the substantially pure forms, the phosphates of three or more equivalents of base have proved effective in the practice of the invention, whereas those phosphates having only two equivalents of base, such as the difficultly soluble secondary calcium ortho phosphate and calcium pyro phosphate, are ineffective in these processes.

Depending upon the particular conditions employed in the preparation of phosphates for the practice of the invention, a variety of differently constituted products may be obtained. These include the normal ortho phosphates such as tricalcium phosphate, its hemi-hydrate 2 $Ca_3(PO_4)_2 \cdot H_2O$, which is believed by some to be the salt, $Ca_3H_2P_2O_9$, of the diatomic acid, $H_4P_2O_9$, which contains the equivalent of two phosphate groups per molecule, and other hydrates, as well as such preferred phosphates as the hydroxy apatites, such as hydroxy apatite (calcium hydroxy hexaphosphate) $3Ca_3(PO_4)_2 \cdot Ca(OH)_2$, which contains the equivalent of six phosphate groups per molecule, and like phosphates having an apatite lattice. However constituted, the phosphates used in the practice of the invention are derivatives of ortho-phosphoric acid even though, in a strict sense, they may not be ortho-phosphates, but may more properly be considered as salts of those phosphoric acids which have at least as much water of constitution as ortho-phosphoric acid, and in which salts at least three equivalents of base are associated in the compounds for each phosphate group.

Where colorless beads are desired, the use of achromatic or colorless phosphates is preferred. These phosphates are obtained with metals having colorless oxides such as aluminum, magnesium, calcium, barium, strontium, zinc and cadmium.

"Surface-active agents" are organic compounds which, when present in a solution in sufficient concentration, have the property of effecting a change in surface phenomena such as the surface tension of the solution medium. These agents, as is well known in the art, function by virtue of an organophylic group associated with a hydrophylic group. "Anionic surface-active agents" are those surface-active agents in which the organophylic group is contained in an anion. For example, the organophylic group may form part of a carboxylate, sulfonate, or sulfate anion. Thus, "anionic surface-active agents" which have been found useful as "extenders" in the practice of this invention include such diverse compounds as sodium caproate, oleic acid and ortho-carboxy-benzene-azodimethylaniline. It appears, however, that the more active surface-active agents are the more effective "extenders" according to the invention. Soaps, for example, are particularly effective. Organic sulfates and sulfonates, such as long chain alkyl sulfates and sulfonates as obtained by the sulfation or sulfonation of alcohols and hydrocarbons; alkali sulfite-addition products of neutral esters of unsaturated polycarboxylic acids; alkyl aromatic sulfonates such as obtained by the sulfonation of alkylated aromatic hydrocarbons; and aryl alkyl polyether sulfonates such as obtained by the sulfonation of the condensation products of ethylene oxide and alkyl phenols, are also particularly effective.

If difficulty soluble phosphates of submicronic particle size are dispersed in water, the particles tend to flocculate or coalesce into relatively large agglomerates. When such phosphates are used as dispersing agents in suspension polymerization, this tendency of the phosphate particles to agglomerate, if uninhibited, causes the formation of large agglomerates during the polymerization. For example, after five hours of polymerization in the presence of difficultly soluble phosphates originally of submicronic particle size, phosphate agglomerates having diameters as large as 160 microns were observed. It was found, however, that by the use of anionic surface-active agents in amounts described later, the agglomerations of the phosphate particles can be controlled.

While no attempt is made to explain the phenomena by which the anionic surface-active agent, or "extender," operates, it is believed that its ability to control flocculation of the phosphate particles is directly connected with its utility in "extending" the dispersing properties of the phosphates in accordance with the invention. Moreover, these phosphate dispersing agents are "extended" by specific effective ranges of concentrations of the anionic surface-active agents. In concentrations below or above these ranges, the anionic surface-active agents are not effective for this purpose and in too high concentrations may have an adverse effect. In fact, concentrations of surface-active agents higher than these ranges permit the formation of agglomerates even larger than the 160 micron agglomerates mentioned above. The use of the term "extended phosphate dispersing agent" is intended to mean, therefore, a phosphate dispersing agent used in association with the proper concentration of anionic surface active agent for "extending" or expanding its utility or function as a dispersing agent. These limits and ranges of concentrations will be discussed and illustrated hereinafter.

The term "extending concentrations," includes those concentrations of anionic surface active agent which, in the presence of an employed phosphate dispersing agent, do not materially affect the surface tension of the aqueous phase. The lower limits on "extending concentrations" are those concentrations below which the anionic surface active agent has no apparent effect on the phosphate dispersing agents according to the invention. The reference to surface tension applies to surface tension of the aqueous phase during the polymerization. For example, with highly active surface-active materials there may be a temporary, initial lowering of the surface tension by about 5-10 dynes per centimeter, as measured by a Du Nuoy tensiometer. This initial lowering is not consequential, however, since the surface tension resumes its original value after the polymerization has proceeded for some time. The effect on the surface tension of adding sodium oleate in an "extending concentration" is illustrated in Tables I and II. This information was obtained in connection with polymerizations conducted at about 90° C., and the surface tension was measured at 21° C. (70° F.) with a Du Nuoy interfacial tensiometer on the clear liquor which had been siphoned off after the suspension had been allowed to stand for a short time.

Table I

[Suspension containing sodium oleate (0.008% based on suspension) and 55% styrene, 0.5% hydroxy apatite, 0.2% benzoyl peroxide (based on styrene), and the balance water.]

| Material Tested | Surface Tension in Dynes/cm. |
|---|---|
| Water used in preparing suspension | 71 |
| Suspension when originally formed | 63 |
| Suspension after 3 hours polymerization | 70 |
| Suspension after 6 hours polymerization | 74 |
| Suspension after 10 hours polymerization | 74 |

Table II

[Suspension containing sodium oleate (0.008% based on total suspension) and 60% styrene, 0.5% hydroxy apatite, 0.175% benzoyl peroxide (based on the styrene), and the balance water.]

| Material Tested | Surface Tension in Dynes/cm. |
|---|---|
| Suspension after 5 hours polymerization | 70 |
| Similar suspension except no styrene, after 5 hours | 70 |
| Similar suspension except no hydroxy apatite, after 5 hours | 68 |
| Water used in preparing suspension | 72 |
| Same water saturated with hydroxy apatite alone | 72 |
| Same water containing 0.02% sodium oleate alone (equivalent to concentration using 0.008% in suspension) | 28 |

The data in the above tables show that, except for a temporary initial lowering of surface tension, sodium oleate in the concentration used and, in the presence of the dispersing agent or styrene, has little or no effect upon the surface tension of the dispersion medium. However, the sodium oleate by itself has a pronounced effect on the water alone at the concentration used.

The amounts of surface-active agents necessary to "extend" phosphate dispersing agents according to the invention are not only very small but the ranges of concentrations in which they are effective in extending the capacity of the dispersing agents to give stable dispersions are rather narrow. These ranges are illustrated by the curves of Figures 7 and 8. Figure 7 illustrates the effects of three of the more common surface-active agents. The curves show effective ranges of these surface-active agents or extenders for stabilizing suspensions containing 60 parts styrene, 40 parts water, 0.5% hydroxy apatite (same material and particle size as described later in Example IV) and 0.175% benzoyl peroxide (based on the styrene) for a polymerization conducted at 90° C. The effective ranges for the three surface-active agents are given in the following table:

Table III

[Effective ranges of surface-active agents used with 0.5% hydroxy apatite.]

| Surface-Active Agent | Concentration in percent based on— | |
|---|---|---|
| | Total Suspension | Dispersing Agent |
| Dodecylbenzene sodium sulfonate (Nacconol NRSF) | 0.0005–0.008 | 0.1–1.6 |
| Dioctyl ester of sodium sulfosuccinic acid (Aerosol OT) | 0.003–0.007 | 0.6–1.4 |
| Sodium oleate | 0.0055–0.032 | 1.1–6.4 |

Figure 8 illustrates the effect on the range of effective or "extending" concentrations of sodium oleate caused by varying the concentration of the dispersing agent and the concentration of the styrene or dispersed phase. With 0.5% hydroxy apatite and 60% styrene, the range is from 0.0055% to 0.032% based on the total weight of the suspension. When the hydroxy apatite is increased to 2% for 60% styrene, the effective range of extender for stability is enlarged to 0.008 to 0.044%. When the styrene content is reduced to 40% with 0.5 hydroxy apatite, the effective range of extender is shifted downward to 0.001 to 0.028%. While these data establish the existence of definite concentration ranges in which the anionic surface-active agents are effective as extenders, it must be understood that the limits of these ranges will shift somewhat depending upon the exact experimental conditions. For instance, the ranges are affected to some extent by the type and speed of stirring, the type and shape of the reaction vessel, the type of monomer, the type of dispersing agent, etc. However, the range of "extending concentrations" of surface-active agents will generally be between about 0.0005 and about 0.05% based on the total suspension and between about 0.1 and about 10% based on the dispersing agent.

The following table illustrates the wide variety of anionic surface-active agents which may be used to extend the phosphate dispersing agents according to the invention. Concentrations are given which have been found effective under the conditions described later in Example IV.

Table IV

| Surface-active Agent | Concentration in percent of— | |
|---|---|---|
| | Total Suspension | Dispersing Agent |
| Sodium tetradecyl sulfate (Tergitol 04) | 0.003 | 0.6 |
| Sodium pentadecyl sulfate (Tergitol 07) | 0.003 | 0.6 |
| Sodium octyl sulfate (Tergitol 08) | 0.008 | 1.6 |
| Sodium sulfate of aryl alkyl polyether sulfonate (Triton 720) | 0.008 | 1.6 |
| Oleic acid | 0.04 | 8 |
| Crude sodium oleate (saponified red oil) | 0.012 | 2.4 |
| Sodium laurate | 0.008 | 1.6 |
| Sodium caprate | 0.008 | 1.6 |
| Sodium caprylate | 0.008 | 1.6 |
| Sodium caproate | 0.024 | 4.8 |
| Potassium stearate | 0.008 | 1.6 |
| Calcium oleate (precipitated in situ from sodium oleate and $CaCl_2$) | 0.008 | 1.6 |
| Calcadur—Red 8BL—diazo dye [1] | 0.008 | 1.6 |
| Azosol—Fast Orange 3RA—monoazo dye [2] | 0.008 | 1.6 |
| Brilliant Carmine L [3] | 0.003 | 0.6 |

[1] Sodium salt of 3,3'-disulfodiphenylurea-4,4'-diazo-bis-amino-8-naphthol-6-sulfonic acid.
[2] Ortho-carboxybenzene-azo-dimethylaniline.
[3] Sodium salt of 2,5,2',5'-tetramethyltriphenylmethane-4,4'-diazo-bis-beta-naphthol-disulfonic acid.

The processes of the invention are applicable to suspension polymerization of any polymerizable ethylenic monomer. By the term "polymerizable ethylenic monomer," it is intended to include any ethylenic compound which is polymerizable under the conditions of suspension polymerization, that is with or without catalysts, such as the peroxide type, for example benzoyl peroxide, possibly under the influence of heat, and at subatmospheric, atmospheric or superatmospheric pressures. Combinations of two or more polymerizable monomers are also included, as well as those ethylenic compounds which will not polymerize by themselves but will do so in conjunction with other monomers.

More particularly, the invention is applicable to the polymerization of vinyl aryl monomers, such as styrene, ortho- or para-monochlorostyrenes, dichlorostyrenes and vinyl naphthalenes. By the processes of the invention it is possible to polymerize aromatic vinyl monomers to clear beads or pearls in concentrations of aqueous suspensions and to molecular weights higher than heretofore possible with a water-insoluble phosphate as the dispersing agent.

The application of the processes of the invention to polymerization of a variety of polymerizable ethylenic monomers is illustrated in the following examples. The parts and percentages in the examples and throughout the specification are by weight unless otherwise specified. In all examples the pH of the dispersion media was about 6 at the time of completion of polymerization, except as otherwise indicated. Molecular weight were determined by using toluene as the solvent and by the formula:

(Intrinsic viscosity) $=KM^a$, where $K$ equals $5.44 \times 10^{-3}$ and $a$ equals 0.8. The intrinsic viscosity was determined in the usual manner by extrapolating a viscosity concentration curve to zero.

In order to facilitate study of the examples it may be well to point out that they are arranged in such an order as to illustrate various points of the invention. Thus Examples I–III, inclusive, show suspension polymerizations carried out without phosphate extender. Example I uses tricalcium phosphate, of the large particle size shown in Figure 3. This example shows that concentrations of 30% styrene or higher could not be used under these conditions with 1% catalyst. Examples II and III show that hydroxy apatite of the fine particle size shown in Figure 1, with 0.4% or more benzoyl peroxide, permitted higher concentrations of styrene to be used but with the large amounts of catalyst relatively brittle, low molecular weight products were obtained.

Examples IV to VI, inclusive, illustrate the effect of sodium oleate as an extender, permitting unusually high concentrations (up to 75%) of styrene to be used with only 0.175% benzoyl peroxide (based on the styrene) in the preparations of beads of polymers having high molecular weights. Example VII shows that even the presence of the extender cannot entirely or completely compensate for or offset the disadvantage of large particle size in the phosphate dispersing agent. Example VIII further illustrates the effect of the extender by showing that the polymerization may be conducted, in the absence of catalyst, with 60% styrene to give high molecular weight products. In Example IX, the effects of small catalyst concentrations are shown to be reflected in increased molecular weights and improved impact strengths of the polymer products.

EXAMPLE I

A suspension, formed from 80 parts of water, 1 part tricalcium phosphate hydrate, reagent grade (large particle size shown in Figure 3) and 20 parts of styrene containing dissolved in it 0.2 part benzoyl peroxide (1% based upon the styrene), was heated at 90° C. with rapid stirring for 5 hours. Beads averaging $\frac{1}{32}$ to $\frac{1}{16}$ of an inch in diameter were obtained.

Efforts to repeat this example with styrene to water ratios of 30 to 70, 40 to 60, and 60 to 40 were unsuccessful.

EXAMPLE II

Suspensions prepared from 50 parts of water, 0.5 part hydroxy apatite (of a particle size having diameters in the order of 0.03–0.06 micron as shown in the electron micrograph of Figure 1) and 50 parts styrene containing different amounts of benzoyl peroxide were heated at 90° C. with rapid stirring to effect polymerization. It was found that polymerization could be effected with 0.4% benzoyl peroxide (based upon the styrene), but with 0.3% the suspensions were not stable.

From these data it will be seen that polymerization may be carried out with much more concentrated suspensions than in Example I and with a substantially lower catalytic activation in suspensions stabilized with phosphate dispersing agents of submicron particle size in accordance with the invention than with phosphate dispersing agents having a larger particle size.

EXAMPLE III

The procedure of Example II was repeated, using a 60–40 styrene to water ratio. It was found that at this concentration the minimum effective catalyst concentration was 0.6% benzoyl peroxide (based upon the styrene). At this concentration, however, stable suspensions could be maintained only when carried out with intense agitation. With less intense agitation, more than 1% of catalyst was necessary.

The data given in Examples I, II, and III show that if the catalyst concentration is sufficiently high, polymerization can be effected without an extender at relatively high concentrations of monomer with phosphate dispersing agents of submicronic particle size or at low concentration of monomer with relatively poor dispersing agents. As it is undesirable in many cases to use such high catalyst concentrations because of the relatively brittle, low molecular weight polymers obtained, the advantage of using an extended phosphate dispersing agent according to the invention is evident. This is further shown by the data given later in Examples VIII and IX.

EXAMPLE IV

A mixture of 40 parts of distilled water, 0.5 part of hydroxy apatite of a fine particle size described later in this example, 0.008 part of sodium oleate, and 60 parts of styrene having dissolved in it 0.105 part of benzoyl peroxide (0.175% based on the styrene) was agitated in a flask provided with an axial impeller type agitator and suspended swirl baffles to form a suspension. The suspension thus formed was heated at 90° C. with continued agitation in a nitrogen atmosphere for 20 hours. The pH of the dispersion medium, which was 5.6 at the finish of the polymerization, was changed to 2 by the addition of concentrated hydrochloric acid, and the charge centrifuged, washed and dried. Clear beads having average diameters of $\frac{1}{32}$ of an inch were obtained. These beads had a molecular weight of about 228,000 as determined by the above equation. The beads, on molding, gave a tough clear bar.

The hydroxy apatite used in this example consisted of uniformly fine particles having a size in the order of 0.03 to 0.06 micron. The micrograph of Figure 1 shows how this material looks under an electron microscope when magnified 25,000 times. The multitude of submicronic particles and the absence of dense or angular agglomerates is particularly evident in this micrograph.

EXAMPLE V

The process of Example IV was repeated using 70 parts of styrene containing dissolved therein 0.1225 part of benzoyl peroxide (0.175% based on the styrene) and 30 parts of water, the other constituents of the mixture and the conditions otherwise being unchanged except that the pH of the dispersion medium at the time of completion of the polymerization was 5.8. Beads substantially identical with those of Example IV were obtained.

EXAMPLE VI

The process of Example IV was repeated using 75 parts of styrene containing 0.131 part of benzoyl peroxide (0.175% based on the styrene), and 25 parts of water with 1 part of hydroxy apatite (same particle size as in Example IV), the other constituents of the mixture and the conditions otherwise being unchanged except that 23.5 hours was required to complete the polymerization and the pH of the suspension medium at the time of completion of the polymerization was 6.7. Very fine beads essentially the same as in Example IV were obtained.

EXAMPLE VII

Figure 2:
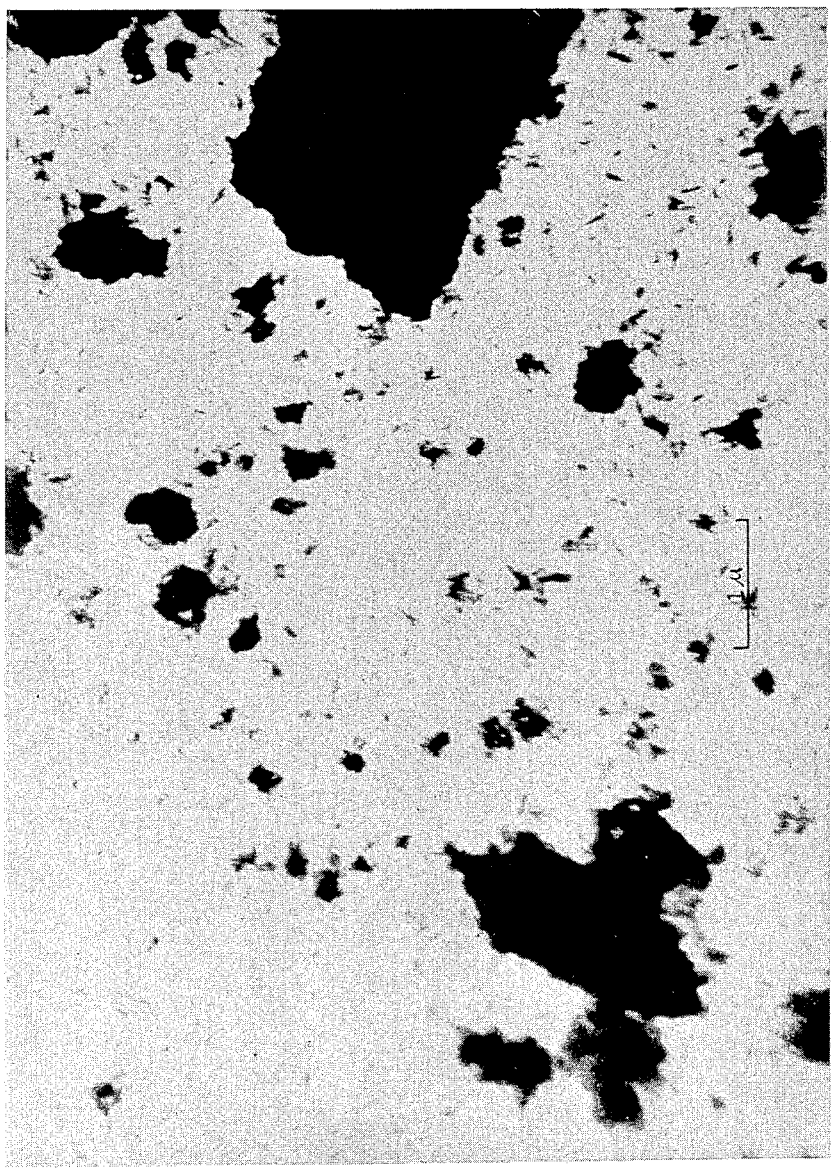

The procedure of Example IV was repeated using a mixture of 80 parts of distilled water, one part of hydroxy apatite (having a particle size of substantially half a micron or more in diameter as shown in Figure 2, which size is larger than that used in Examples IV, V and VI), 0.022 part sodium oleate and 20 parts of styrene having dissolved in it 0.035 part benzoyl peroxide (0.175% based on the styrene). Otherwise the conditions were the same as in Example IV. Beads having diameters of between about ⅛ and ¼ inch were obtained.

The relatively large size of the beads obtained as compared with those obtained according to Examples IV, V and VI, indicates that the suspension was less stable. This fact is also shown by the fact that in a duplicate run precipitation occurred before completion of the polymerization. These results show that hydroxy apatite of particle size predominantly larger than the order of a submicron gives inferior results even in the presence of an anionic surface-active agent.

EXAMPLE VIII

A suspension prepared from 40 parts of distilled water, 60 parts styrene, 1 part hydroxy apatite of Example IV and 0.008 part sodium oleate was heated at 90° C. with stirring for 5 days. Fine beads were obtained.

The results of this example show that suspensions prepared with a phosphate dispersing agent extended by means of an anionic surface-active agent may be polymerized without using any catalyst, even with an unusually high ratio of monomer to water. Suspensions so formed, unlike those formed with unextended phosphate dispersing agents, are operative regardless of catalyst content. This makes it possible to produce bead polymers having a much wider variety of physical properties than heretofore possible with phosphate dispersing agents according to the prior art.

EXAMPLE IX

Suspensions, formed with 40 parts water, 0.5 part hydroxy apatite as in Example IV, 60 parts styrene, and 0.008 part sodium oleate, and containing different concentrations of benzoyl peroxide, were polymerized at 90° C. The results are given in the following table:

Table V

| Catalyst Concentration (Based on Styrene) | Viscosity | | Molecular Weight | Izod Impact Strength of Unnotched Bars [1] |
|---|---|---|---|---|
| | Relative (1% Solution in Toluene) | Intrinsic | | |
| Per cent | | | | ft. lbs. |
| 0.5 | 1.457 | 0.4 | 74,000 | 0.58 |
| 0.3 | 1.846 | 0.75 | 161,000 | 1.23 |
| 0.2 | 2.400 | 1.00 | 228,000 | 1.67 |

[1] ASTM No. D 256-43T.

These data show how the molecular weight increases as the catalyst concentration is decreased. They also show that as the catalyst concentration is decreased, the impact strength increases. Thus, compared with results obtained with the unextended phosphate dispersing agents, the use of phosphate dispersing agents extended according to the invention makes possible a markedly greater rate of plant output of high molecular weight bead polymers.

Figure 3:
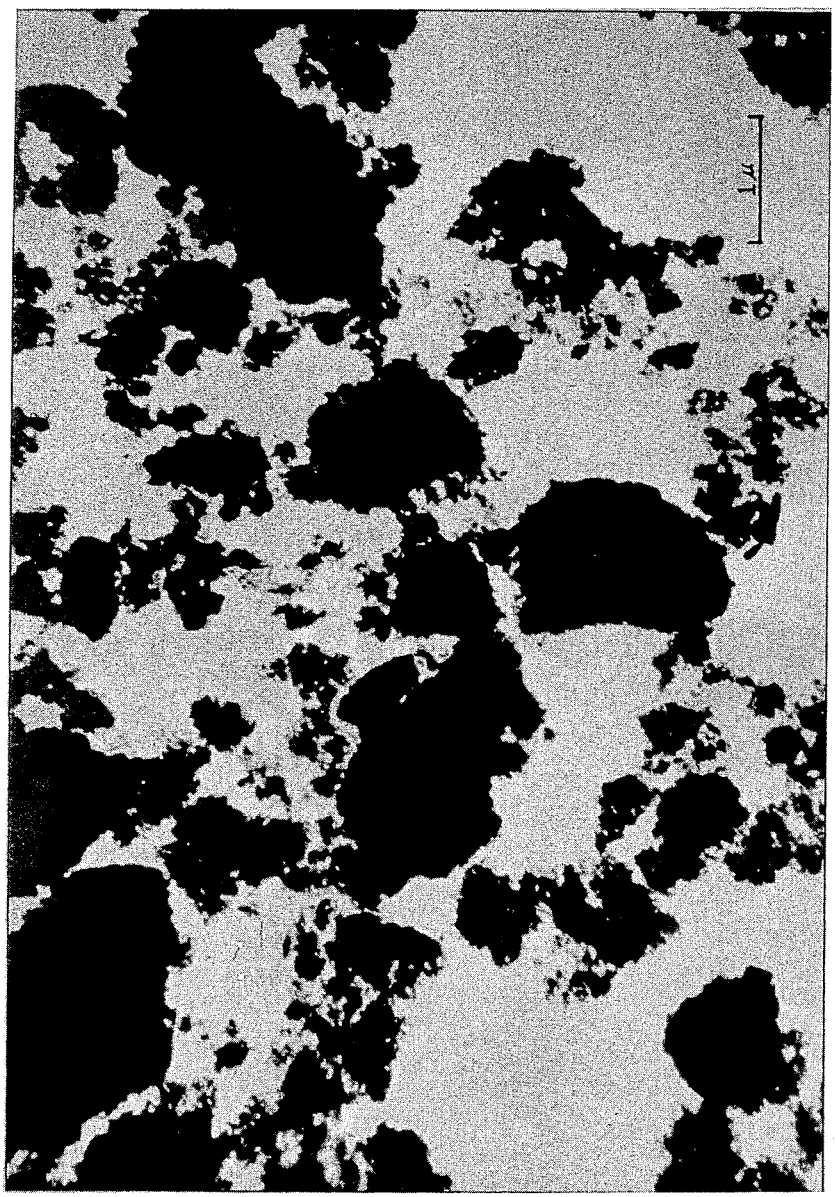
Figure 4:

As indicated in Example VII, Figure 2 is an electron micrograph of a hydroxy apatite having a particle size of a half micron or more in diameter, substantially larger than that illustrated in Figure 1. This hydroxy apatite could not be substituted for that used in Examples IV, V, and VI, and was effective only in much lower concentrations of styrene as shown in Example VII. Figure 3 is an electron micrograph of calcium phosphate hydrate, reagent grade, which shows the predominance of large dense masses and the substantial absence of particles of submicronic size. The material in this form is a poor dispersing agent and cannot be substituted for the hydroxy apatite in Examples IV, V and VI. However, the dispersing properties of this material were somewhat improved by rapid stirring and heating in water for 20 hours so as to reduce the particle size. Dispersing properties of poor phosphate dispersing agents may sometimes also be improved by reducing the particle size of the same in a ball mill, colloid mill, or homogenizer. Sometimes, however, the agglomerates are too dense and too hard to be broken down easily to small particle size by these treatments. For example, Figure 4 shows an electron micrograph of C. P. grade of tricalcium phosphate magnified 18,500 times, which has dense, massive particles that could not be broken by the above means into particles of a size suitable for use as dispersing agent.

In the practice of the invention the amount of phosphate dispersing agent may be varied widely in accordance with the activity of the dispersing agent, the size of beads desired, the amount of extender or surface-active agent used, etc. Generally however, the amount will be between 0.1% and about 5% or more of the total suspension, although ordinarily not more than about 1% will be necessary.

With a phosphate dispersing agent extended in accordance with the invention, it is possible also to control somewhat the size of the beads produced merely by adjusting the amount of phosphate dispersing agent and the amount of extender or anionic surface-active agent used in the polymerization suspension. Usually with the amount of agitation constant the bead size is quite uniform for the beads of any particular run, but this uniform size or the average size may be adjusted over a wide range. For example, beads may be obtained having diameters as large as several millimeters; or beads may be made, by the adjustments indicated, having diameters as small as about 30 microns. However, without an extender for the phosphate dispersing agent, control of the bead size is difficult and small beads are obtained only with vigorous agitation and with relatively large amounts of catalyst.

Tables VI, VII and VIII show the effect on the bead size caused by various concentrations of hydroxy apatite and sodium dodecyl benzene sulfonate or sodium oleate. In all cases, the polymerizations were run according to the procedure in Example IV, with 40 parts water, 60 parts styrene containing dissolved in it 0.105 parts benzoyl peroxide (0.175% based on the styrene), and amounts of hydroxy apatite and sodium dodecyl benzene sulfonate or sodium oleate were used as indicated in the tables:

Table VI

[Concentration of sodium dodecyl benzene sulfonate equals 0.002% in all cases.]

| Percent of Hydroxy Apatite Based on Total Suspension | Average Bead Diameter in Microns |
|---|---|
| 0.5 | 1,952 |
| 1.0 | 312 |
| 1.5 | 245 |
| 1.75 | 237 |
| 2.0 | 405 |
| 3.0 | 439 |

The data given in this table show that the bead size decreases as the amount of phosphate dispersing agent is increased to 1.75% and then increases for higher percentages of dispersing agent.

Table VII

| Percent of sodium oleate (Based on total suspension) | Average Bead Diameters in Microns for Different Percentages of Dispersing Agent | |
|---|---|---|
| | 0.5% | 1.0% |
| 0.008 | 1,700 | 1,505 |
| 0.012 | 387 | 207 |
| 0.016 | 855 | 257 |
| 0.024 | 1,075 | 352 |
| 0.030 | 2,720 | 401 |
| 0.032 | | 1,165 |
| 0.034 | | 1,070 |

The data in this table show that the bead size becomes smaller as the amount of surface-active agent or extender is increased (up to about 0.012%), and then increases for still larger amounts of extender. From the data of this table, it is obvious that the bead size of the polymerization products usually may be controlled over a wide range by selecting suitable proportions of dispersing agent and extender.

Table VIII further illustrates control over bead size by showing the results obtained by proportionately increasing the concentration of both the hydroxy apatite and sodium oleate. It will be seen from these data that the beads become progressively smaller as the amounts of dispersing agent and surface-active agent are increased.

*Table VIII*

[Percentages based on total suspension.]

| Percent of Hydroxy Apatite | Percent of Sodium Oleate | Average Bead Diameter in Microns |
|---|---|---|
| 0.5 | 0.008 | 1,700 |
| 1.0 | 0.016 | 375 |
| 1.5 | 0.024 | 216 |
| 2.0 | 0.032 | 175 |

While the invention and the advantages thereof have been illustrated with particular reference to styrene as the polymerizable ethylenic monomer, particular calcium phosphates as the dispersing agent, and sodium oleate as the extender, it will be understood that other like materials may be used in their places. Thus, in place of difficulty soluble phosphates of calcium, the difficulty soluble phosphates of other metals such as aluminum, barium, strontium, magnesium, zinc and cadmium may be used to give clear beads according to the processes set forth above. Also, in place of sodium oleate there may be substituted the surface-active agents noted above, as well as many others of the anionic type, especially the highly active surface-active agents such as the organic sulfonates, sulfates and carboxylates, each organic residue of which contains one or more alkyl groups totaling up to about 18 carbon atoms, and preferably containing more than 6 carbon atoms.

Also, in place of styrene there may be used various polymerizable ethylenic monomers including ortho-chlorostyrene; para-chlorostyrene; 2,6-dichlorostyrene; 2,4-dichlorostyrene; 2,5-dichlorostyrene; 2,3-dichlorostyrene; 3,4-dichlorostyrene; the higher polychlorostyrenes; para-methylstyrene; ortho - methylstyrene; meta-methylstyrene; ethyl vinyl benzenes; 4-vinyl pyridine; vinyl naphthalene; the mixtures of these with each other or with styrene, or other copolymerizing material such as acrylonitrile; fumaronitrile, maleimide; methylmethacrylate; butyl acrylate; divinylbenzene; isopropenylbenzene; polychloro ring-substituted isopropenylbenzene; para, para'-diisopropenyl diphenyl; para-vinyldiphenyl; methacrylonitrile; acrylic acid; butadiene; isoprene; 2,3-dimethylbutadiene; 2-chlorobutadiene-1,3; vinylidene chloride; etc.

The versatility of the invention in the above-noted respects is illustrated above in Tables III and IV, showing the use of various extenders, and in the following examples. Examples X to XIII, inclusive, show the utility of various phosphates as dispersing agents in the practice of the invention; and Examples XIV to XXVI, inclusive, illustrate the preparation of bead polymers or copolymers using various polymerizable ethylenic monomers or mixtures thereof.

EXAMPLE X

A suspension, formed of 40 parts distilled water, 0.5 part magnesium phosphate, 0.008 part sodium oleate and 60 parts styrene having dissolved therein 0.015 part benzoyl peroxide (0.175% based on the styrene), was heated at 90° C. for 20 hours with stirring. The pH of the aqueous suspension medium was 7.2 at the time of completion of the polymerization. The beads obtained were about $\frac{1}{8}$ inch in diameter.

Figure 5:
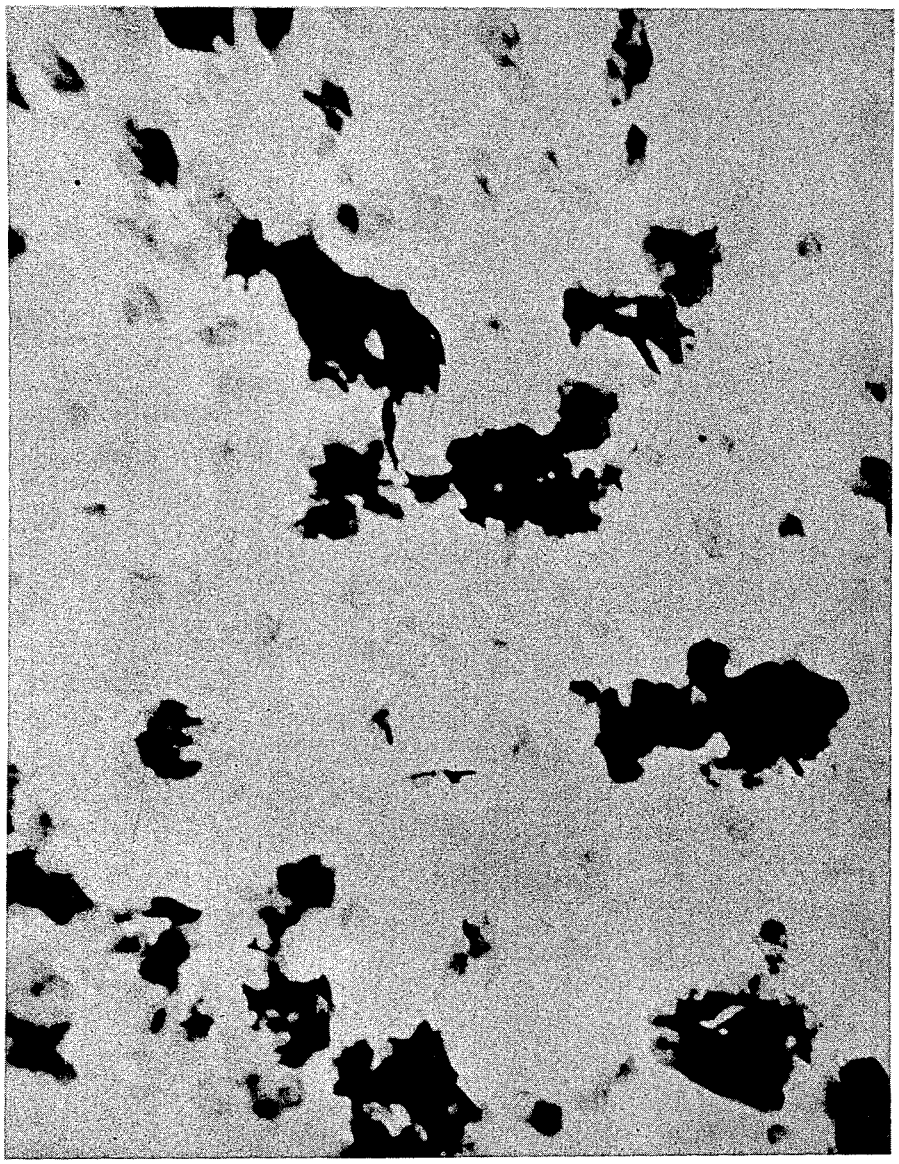
Figure 6:
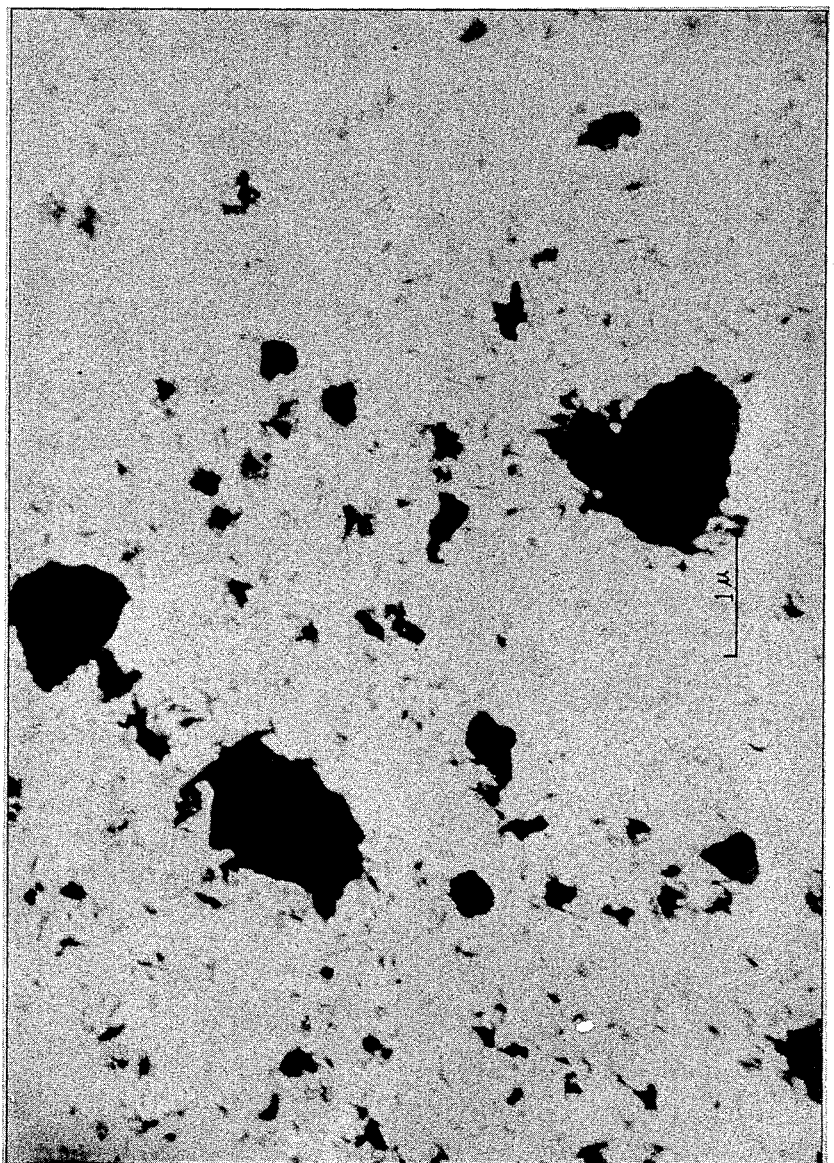

The magnesium phosphate used in this example was shown by X-ray analysis to be a hydrate consisting of a mixture of tetra- and octa hydrates of normal trimagnesium phosphate. Figure 5 is an electron micrograph illustrating the particle size of this material to be submicronic.

EXAMPLE XI

Finely divided zinc phosphate was prepared by adding slowly, at room temperature and with stirring, a solution of 424 parts of zinc chloride in 1000 parts of distilled water to a solution of 718 parts of trisodium phosphate dodecahydrate in 400 parts of water. The pH was adjusted to neutrality, and an aliquot portion of this preparation was used in the following steps.

A suspension, consisting of 60 parts distilled water, 1 part of the above-prepared zinc phosphate, 0.02 part sodium oleate and 40 parts styrene, having dissolved in it 0.07 part benzoyl peroxide (0.175% based on the styrene), was heated at 90° C. with stirring for 20 hours. The pH of the suspension medium was 7.2 at the time of completion of the polymerization. Beads ranging from about $\frac{1}{8}$ to about $\frac{1}{16}$ of an inch in diameter were obtained.

EXAMPLE XII

Finely divided aluminum phosphate was prepared by adding at room temperature and with stirring, a solution containing 19.8 parts of aluminum chloride hexahydrate in 50 parts of distilled water to a solution containing 23 parts of trisodium phosphate dodecahydrate in 100 parts of water. The pH of this solution was 5.5. An aliquot portion of this suspension was used in the following steps.

A suspension, consisting of 60 parts distilled water, 1 part of the above-prepared aluminum phosphate, 0.003 part sodium oleate and 40 parts styrene containing dissolved in it 0.07 part benzoyl peroxide (0.175% based on the styrene), was heated at 90° C. with stirring for 20 hours. The pH of the suspension medium was 5.4 at the time of completion of the polymerization. Beads ranging from about $\frac{1}{8}$ to about $\frac{1}{16}$ of an inch in diameter were obtained.

EXAMPLE XIII

Finely divided cadmium phosphate was prepared by adding, at room temperature and with stirring, a solution containing 26 parts cadmium chloride in 100 parts of distilled water to a solution containing 28.8 parts of the sodium phosphate dodecahydrate in 200 parts of water. An aliquot portion of this preparation was used in the following steps.

A suspension, consisting of 60 parts distilled water, 1 part of the above-prepared cadmium phosphate, 0.008 part sodium oleate and 40 parts styrene containing dissolved in it 0.07 part benzoyl peroxide (0.175% based on the styrene), was heated at 90° C. with stirring for 20 hours. The pH of the suspension medium was 5.6 at the time of completion of the polymerization. Very fine beads $\frac{1}{32}$ of an inch in diameter or less were obtained.

EXAMPLE XIV

A suspension, formed of 60 parts distilled water, 1 part hydroxy apatite (Figure 6), 0.003 part sodium dodecyl benzene sulfonate and 40 parts of mixed dichloro styrenes containing dissolved therein 0.02 part benzoyl peroxide (0.05% based on the dichlorostyrenes) was heated at 80° C. for 20 hours with stirring. Clear beads having diameters of about 1/64 inch were obtained.

The dispersing agent used in this example and in Example XV was shown by X-ray analysis to be hydroxy apatite. Its particle size is illustrated in the electron micrograph of Figure 6 to be comparable to that of Figure 1.

EXAMPLE XV

A suspension, formed from 60 parts distilled water, 1 part hydroxy apatite (Figure 6), 0.008 part sodium oleate and 40 parts of mixed dichloro styrenes containing dissolved therein 0.08 part benzoyl peroxide (0.2% based on the dichlorostyrenes), was heated at 80° C. for 20 hours with stirring. Clear beads about 1/64 inch in diameter were obtained.

EXAMPLE XVI

A suspension, formed of 60 parts of distilled water, 1 part hydroxy apatite (same particle size as in Example IV), 0.008 part sodium oleate and 40 parts of 4-vinyl pyridine containing dissolved in it about 0.08 part benzoyl peroxide (0.2% based on the vinyl pyridine), was agitated in a closed glass container at 90° C. for 16 hours. Fine beads 1/8 inch in diameter or smaller were obtained.

EXAMPLE XVII

A suspension, formed of 80 parts of distilled water, 1 part hydroxy apatite (same particle size as in Example IV), 0.008 part sodium oleate and 20 parts methylmethacrylate containing dissolved in it about 0.035 part benzoyl peroxide (0.175% based on the methacrylate), was heated at 90° C. with stirring for 20 hours. Very fine beads were obtained.

EXAMPLE XVIII

A suspension, formed from 75 parts of water, 1 part of hydroxy apatite (same particle size as in Example IV), and 0.008 part of sodium oleate, and 25 parts of a mixture of 16.6 parts styrene, 8.3 parts vinyl naphthalene and 0.044 part of benzoyl peroxide (0.175% based on the olefins), was heated at 90° C. with stirring for 20 hours. Very fine beads were obtained.

EXAMPLE XIX

A suspension, formed of 70 parts of distilled water, 1 part hydroxy apatite (same particle size as in Example IV), 0.008 part sodium oleate, and 30 parts of a mixture of 22.5 parts styrene, 7.5 parts ortho-monochlorostyrene and 0.06 part of benzoyl peroxide (0.2% based on the olefins) was agitated in a closed glass container for 16 hours at 90° C. Fine beads were obtained.

EXAMPLE XX

A suspension, formed from 60 parts water, 1 part hydroxy apatite (same particle size as in Example IV), 0.008 part sodium oleate and 40 parts of a mixture of 36 parts of styrene, 4 parts of acrylonitrile and 0.07 part benzoyl peroxide (0.175% based on the olefins), was agitated in a closed container at 90° C. for 16 hours. Fine beads were obtained.

EXAMPLE XXI

A suspension, formed from 70 parts water, 1 part hydroxy apatite (same particle size as in Example IV), 0.008 part sodium oleate and 30 parts of a mixture containing 28.5 parts styrene, 1.5 parts lauryl methacrylate, and 0.06 part benzoyl peroxide (0.2% based on the olefins), was agitated in a closed glass container at 90° C. for 16 hours. Fine white beads were obtained.

EXAMPLE XXII

A suspension, formed of 80 parts of water, 1 part hydroxy apatite (same particle size as in Example IV), 0.008 part sodium oleate and 20 parts of a mixture of 13 parts styrene, 7 parts dichloro styrene (mixed isomers) and 0.035 part benzoyl peroxide (0.175% based on the olefins), was stirred at 90° C. for 20 hours. Fine beads were obtained.

EXAMPLE XXIII

A suspension, formed of 80 parts water, 1 part hydroxy apatite (same particle size as in Example IV), 0.008 part sodium oleate and 20 parts of a mixture of 18 parts styrene, 2 parts acrylic acid, and 0.035 part benzoyl peroxide (0.175% based on the olefins), was stirred at 90° C. for 20 hours. Fine yellow beads were obtained.

EXAMPLE XXIV

A suspension, formed of 50 parts water, 1 part hydroxy apatite (same particle size as in Example IV), 0.008 part sodium oleate and 50 parts of a mixture of 25 parts of styrene, 25 parts of vinylidene chloride and 0.087 part benzoyl peroxide (0.175% based on the olefins), was stirred at 90° C. for 20 hours. Fine beads were obtained.

EXAMPLE XXV

A suspension, formed of 60 parts water, 1 part hydroxy apatite (same particle size as in Example IV), 0.008 part sodium oleate and 40 parts of a mixture of 36 parts styrene, 4 parts butyl acrylate and 0.07 part benzoyl peroxide (0.175% based on the olefins), was stirred at 90° C. for 20 hours. Fine beads were obtained.

EXAMPLE XXVI

A suspension, formed of 88 parts water, 1 part hydroxy apatite (same particle size as in Example IV), 0.008 part sodium oleate and 12 parts of a dehydrogenated diethylbenzene mixture containing 3.6 parts divinylbenzene, 8.4 parts other products of the dehydrogenation, and 0.21 part benzoyl peroxide (0.175% based on the hydrocarbons), was stirred at 90° C. for 20 hours. Very fine beads were obtained.

Further, to modify the properties of the polymers and copolymers prepared in accordance with the practice of the invention, there may be included plasticisers such as dibutylphthalate and butyl Cellosolve stearate, as well as dyes, opacifiers, mold lubricants and the like.

In place of benzoyl peroxide there may be substituted other polymerization catalysts. Preferably, the catalysts should be soluble in styrene or in whatever polymerizable ethylenic monomer is used. Thus, in place of benzoyl peroxide there may be used acetyl peroxide, tertiary-butyl hydroperoxide, ditertiarybutyl peroxide, lauryl peroxide, phthalyl peroxide, tetrahydrophthalyl peroxide, succinyl peroxide, etc., and combinations of these.

The amount of catalyst may be varied according to the nature and activity of the particular catalyst, according to the nature of the particular polymerizable material, and according to the product desired. An especial advantage is obtained in polymerizations according to the present invention in that the amount of catalyst may be varied over a wide range or even omitted. It is advantageous, particularly where bead polymers suitable for injection molding are desired, to keep the catalyst activation below that equivalent at about 90° C. to about 0.3% benzoyl peroxide based upon the polymerizable ethylenic monomer. By using this low catalytic activation coupled with a phosphate dispersing agent extended by an anionic surface-active agent in accordance with the invention it is possible to obtain high molecular weight polymers. Moreover, by means of the present invention, it is possible to maintain an extraordinarily high ratio of olefin to water, e. g., 1–3 parts of polymerizable ethylenic monomer for each part of water, and at the same time produce tough, high molecular weight polymers suitable for injection molding.

The temperature may be varied according to the nature of the polymerizable material used and the type of polymer desired. Ordinarily, however, for styrene a temperature somewhat below the boiling point of water, say about 90 or 95° C. will be advantageous unless the polymerization is carried out in a pressure vessel. The use of pressure and the higher temperatures obtainable thereby may be used advantageously to speed up the polymerization. Pressure vessels may also be used advantageously for the more volatile polymerizable materials.

The pH of the dispersion medium may be varied over a wide range without apparent effect on the stability of the suspension or the polymerization. It should be borne in mind, however, that if the pH is too high, peroxide catalysts such as benzoyl peroxide, will be inactivated and if it is too low the acid soluble phosphate will be solubilized or chemically changed. It is desirable, therefore, to operate with a pH ranging between about 3 and 8, until the final washing operation when the pH may be reduced to about 2 in order to solubilize the phosphate dispersing agent.

While the invention has been described with reference to particular embodiments thereof, it will be understood that in its broader aspects the invention is not limited thereto, but the invention may be variously embodied within the scope of the invention as set forth herein and in the appended claims.

The use of an anionic surface-active agent as an extender for a phosphate dispersing agent disclosed herein is claimed in my presently copending application Serial No. 255,590, filed November 9, 1951.

What is claimed is:

1. In a process for preparing polymer beads, the steps of forming an aqueous suspension by adding to water in one portion a polymerizable composition comprising a polymerizable ethylenic monomer, stabilizing said suspension by means of from about 0.1% to about 5% by weight based on the system of a phosphate, difficultly soluble in water and containing for each phosphate group at least three equivalents of a metal, the carbonate of which is at most only slightly soluble in water, said phosphate being comprised of particles predominantly of a size in the range 0.2–0.005 micron, and effecting polymerization of said ethylenic monomer while thus dispersed, in which process the ratio in parts by weight of said ethylenic monomer to water is no less than 1:1.

2. The process of claim 1, in which the polymerizable composition comprises a vinyl aromatic compound.

3. The process of claim 1, in which the polymerizable composition comprises styrene.

4. The process of claim 1, in which the phosphate is hydroxy apatite.

5. The process of claim 1, in which the polymerizable composition comprises a vinyl aromatic compound and the phosphate is hydroxy apatite.

6. The process of claim 1, in which the polymerizable composition comprises styrene and the phosphate is hydroxy apatite.

7. The process of claim 1, in which the phosphate is tricalcium phosphate.

8. The process of claim 1, in which the phosphate is trimagnesium phosphate.

9. The process of claim 1, in which the polymerizable composition comprises a vinyl aromatic compound and the phosphate is trimagnesium phosphate.

10. The process of claim 1, in which the polymerizable composition comprises styrene and the phosphate is trimagnesium phosphate.

11. The process of claim 1, in which the phosphate is tribarium phosphate.

12. The process of claim 1, in which the phosphate is a synthetic calcium phosphate having a ratio by weight of $CaO/P_2O_5$ at least equal to 1.3, said phosphate being prepared by the reaction of orthophosphoric acid and calcium oxide.

13. The process of claim 12, in which the polymerizable composition comprises styrene.

JOHN MARSHALL GRIM.

REFERENCES CITED

The following references are of record in the file of this patent:

UNITED STATES PATENTS

| Number | Name | Date |
| --- | --- | --- |
| 2,171,765 | Rohm | Sept. 5, 1939 |
| 2,279,436 | Berg | Apr. 14, 1942 |
| 2,440,808 | Neher | May 4, 1948 |
| 2,524,627 | Hohenstein | Oct. 3, 1950 |

OTHER REFERENCES

Hohenstein et al., J. Polymer Science, 1, 127–145, especially page 139 (March 1946).